J. M. TOWNE.
METHOD OF MANUFACTURING GASKETS.
APPLICATION FILED JULY 22, 1909.
966,873.
Patented Aug. 9, 1910.
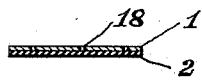
Fig. I
Fig. II
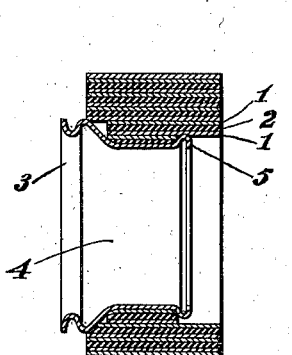
Fig. III
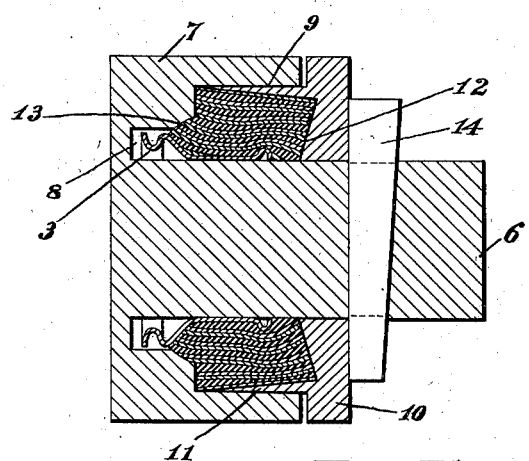
Fig. IV
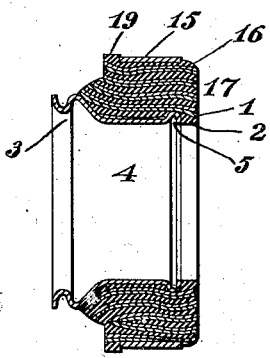
Fig. V
Witnesses:
Inventor
Joseph M. Towne
By his Attorney

UNITED STATES PATENT OFFICE.

JOSEPH M. TOWNE, OF EAST ORANGE, NEW JERSEY, ASSIGNOR TO SAFETY CAR HEATING & LIGHTING COMPANY, A CORPORATION OF NEW JERSEY.

METHOD OF MANUFACTURING GASKETS.

966,873.  Specification of Letters Patent.  Patented Aug. 9, 1910.

Application filed July 22, 1909. Serial No. 508,915.

*To all whom it may concern:*

Be it known that I, JOSEPH M. TOWNE, a citizen of the United States, residing in East Orange, county of Essex, and State of New Jersey, have invented new and useful Improvements in Methods of Manufacturing Gaskets, of which the following is a description.

My invention pertains to the manufacture of that class of gaskets adapted to be repeatedly used in making up temporary steam tight joints and has for its particular object to provide a method of making gaskets which will withstand high internal pressure and repeated application of heavy pressure against the face without crumbling, flattening, or being injured by abrasion.

A further object is to provide a method of making gaskets possessing the above qualifications which shall also possess considerable resiliency and at the same time expand slightly under the action of heat so as to be very applicable for use in making temporary steam tight joints.

As gaskets made in accordance with my method are particularly applicable for use in straight-port steam couplers, the method will be explained in connection with the manufacture of a gasket intended for this use while it will, of course, be obvious that the same method may be pursued in making gaskets for any purpose whatever without departing from the scope of my invention.

In the drawing Figure I shows a cross section of one form of material out of which my gasket may be made. Fig. II shows a slight modification of the material as used in making up my gasket. Fig. III is a cross section of the gasket partly finished in accordance with my method. Fig. IV is a cross section of the mold and one of my gaskets at a certain point in my process which will hereinafter be described. Fig. V shows a cross section of a finished gasket made in accordance with my method.

My improved method of manufacturing gaskets of one form as employed by me is substantially as follows:

Ribbons of suitable length are made up out of strips of fibrous material and vulcanizable elastic material such as rubber or some of its compounds as shown in section in Fig. I, in which 1 represents a section of the fibrous material which, for example, may be asbestos paper and 2 the yielding vulcanizable material which, for example, may be "usudurian" packing. These materials are cemented together as, for example, by rubber cement and if desired the fibrous material 1 may be provided with small perforations therein, as indicated by 18, for the purpose which will hereinafter be described.

A slightly modified form of ribbon is shown in Fig. II in which the vulcanizable elastic material 2 is shown as having applied to each side thereof a layer of the fibrous material 1.

In making these ribbons for use in the manufacture of my gaskets I find that a very good gasket is produced if asbestos paper $\frac{1}{64}$ inch in thickness be cemented to usudurian packing of about the same thickness.

To make the particular form of gasket shown in section in Fig. III, I first cut one of the ribbons shown in Figs. I and II lengthwise so as to form a ribbon one-half the usual width and cover the same on one side with cement. I then take the metallic thimble 3, having the central aperture 4 and spun flange 5, and wind upon the same a portion of the narrow ribbon as shown clearly in Fig. III; that is, the narrow ribbon is wound to produce a slightly greater diameter than the outside diameter of the flange 5. I then take a ribbon of the regular width as shown in Figs. I and II, cement the same on one side and wind this upon the narrow layers previously applied as clearly shown in section in Fig. III until a suitable outside diameter is produced. I then slip the thimble and gasket over the mandrel 6 of the mold 7 which is provided with a recess 8 to receive the flange of the thimble, and press the gasket back until the same fills the cavity 9 of the said mold. Then the member 10, provided with the knife-edged, tapering portion 11, is passed over the end of the mandrel 6 and the outer edge of the gasket is inserted into the conical bore thereof. Then sufficient pressure is applied as by means of a hydraulic press or other suitable mechanism to force the member 10 into the position indicated in the drawing when the left-hand portion of the gasket will take shape of the mold indicated at 13 and the right-hand face portion of the gasket will be forced into the shape indicated at 12 by the conical surface of the member 10 which, owing to its conical shape, will cause the yielding material to be firmly forced around the flange 5 and subjected at this point to extra pressure. The key 14 is then passed through the mandrel 6 so as to hold the mold 7 and the member 10 in the positions shown in the drawing and retain the gasket in the shape shown under high pressure. The mold is then placed in an oven or suitable vulcanizer and brought to a temperature of approximately 325 degrees Fahrenheit, at which temperature it is held for approximately one hour after which the mold and gasket are allowed to cool and the gasket then withdrawn from the mold, at which time a section of the gasket is substantially as shown in position in the mold in Fig. IV. The gasket is then placed in a lathe and turned down to such diameter as will tightly fit the metallic armor or retaining ring indicated at 15, a suitable shoulder or flange 19 being left as indicated. The ring 15 is then forced into place and the face of the gasket trued up as indicated at 17 and chamfered, or rounded, on the edge as indicated at 16. It will be noticed that this method produces a laminated gasket, the laminæ of which are alternately resilient vulcanizable material and fibrous tough wearing material and the action of the pressure of the mold and vulcanizing of the material while under that pressure tends to form the entire mass of yielding material into a permanent structure combining the wearing quality of the fibrous material with the elastic quality of the vulcanizable material. If the fibrous ribbons be provided with holes as indicated at 18 the vulcanizable material will be forced through the same so as to unite on each side thereof.

I do not wish in any way to limit myself to the exact procedure outlined above nor in any way to the apparatus which I have described as useful in the performance of my method of manufacturing gaskets as it is obvious that wide departure may be made without departing from the scope of my invention which is as set forth in the following claims.

I claim—

1. The method of manufacturing gaskets which consists in winding continuous layers of fibrous and vulcanizable materials upon each other to form an annular mass, then subjecting the same to pressure and vulcanizing the same under pressure.

2. The process of manufacturing gaskets which consists of forming an annular structure of alternate and substantially concentric continuous layers of hard fibrous material and softer vulcanizable material, then subjecting the mass to pressure and to high temperature under pressure.

3. The method of manufacturing gaskets adapted to be subjected to high pressure between surfaces which consists in winding alternate layers of hard fibrous material and more elastic vulcanizable material into a form approximating that of the finished gasket, then subjecting the same to pressure in the direction to be resisted by the finished gasket and vulcanizing the same while under pressure.

4. The process of making gaskets which consists in winding alternate layers of hard fibrous material and more elastic vulcanizable material about a central axis, subjecting the same to radial and longitudinal pressure and subjecting the so laminated material to vulcanizing temperature and then cooling the same.

5. The method of manufacturing gaskets adapted to withstand internal pressure and longitudinal compression which consists in forming alternate laminæ of elastic and hard fibrous materials about a central axis, subjecting the same to radial and longitudinal pressure and then raising the temperature to approximately 325 degrees Fahrenheit and then cooling the same.

6. The method of manufacturing gaskets which consists in forming continuous ribbons made up of alternate layers of fibrous and vulcanizable materials, winding said ribbons about a central axis, subjecting the material so wound to pressure and vulcanizing temperature and then cooling the same.

7. The process of manufacturing gaskets which consists in cementing together to form a ribbon layers of asbestos paper and a rubber compound, applying cement thereto, winding said ribbons about a central axis to give the gasket a radial depth, subjecting the mass so wound to pressure and raising the temperature to that sufficient to vulcanize the rubber compound.

8. The process of manufacturing gaskets which consists in cementing together asbestos paper provided with perforations and a rubber compound to form a ribbon, winding said ribbon about a central axis to produce a structure of sufficient radial depth, subjecting the same to high pressure to force the mass into approximately the shape of the finished gasket and subjecting the same to high temperature for the purpose of vulcanizing the vulcanizable portion thereof.

9. The process of manufacturing gaskets which consists in forming ribbons of alternate layers of fibrous and elastic materials, winding the same upon a metallic sleeve, subjecting the same to pressure against the sleeve and vulcanizing under pressure.

10. The process of manufacturing gaskets which consists in winding layers of fibrous and vulcanizable materials about a central axis, compressing the same, subjecting to high temperature for vulcanizing and then turning into the shape desired.

11. The method of manufacturing gaskets which consists in cementing together layers of fibrous and elastic materials, winding the same about a central axis, compressing the mass so wound, subjecting the same to vulcanizing temperature and then machining the same into the desired form.

12. The method of manufacturing gaskets which consists in building up a structure of alternate laminæ of elastic vulcanizable material and fibrous material, compressing the same into a desired conformation and subjecting the same so compressed to the action of vulcanizing temperature.

13. The method of manufacturing gaskets which consist in winding layers of a rubber compound and a fibrous material upon a sleeve provided with an expanded portion, subjecting said winding to radial and longitudinal pressure in such manner as to inclose the said expanded portion of the sleeve, then vulcanizing the rubber compound.

14. The method of manufacturing gaskets which consists in winding laminæ of hard fibrous material and softer rubber material about a central axis, subjecting the said materials to sufficient pressure within a mold to take the desired form thereof, then vulcanizing the rubber material while in said mold then removing the same from said mold.

15. The process of manufacturing gaskets which consists in building up a laminated structure of fibrous and vulcanizable materials and forcing a retaining ring thereon.

JOSEPH M. TOWNE.

Witnesses:
   JOHN T. CLARK,
   E. HALL.